(12) United States Patent
Nam et al.

(10) Patent No.: US 9,217,656 B2
(45) Date of Patent: Dec. 22, 2015

(54) INTERNET TELEMATICS SERVICE PROVIDING SYSTEM AND INTERNET TELEMATICS SERVICE PROVIDING METHOD FOR PROVIDING MILEAGE-RELATED DRIVING INFORMATION

(75) Inventors: Kyung Bo Nam, Seongnam-si (KR); Choong Hee Lee, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 177 days.

(21) Appl. No.: 13/216,223

(22) Filed: Aug. 23, 2011

(65) Prior Publication Data

US 2012/0053824 A1  Mar. 1, 2012

(30) Foreign Application Priority Data

Aug. 25, 2010  (KR) .................. 10-2010-0082310

(51) Int. Cl.
*B60W 50/00* (2006.01)
*G08G 1/00* (2006.01)
(Continued)

(52) U.S. Cl.
CPC ............... *G01F 9/001* (2013.01); *B60W 40/09* (2013.01); *B60W 50/14* (2013.01); *G07C 5/008* (2013.01);
(Continued)

(58) Field of Classification Search
CPC ..... B60W 40/08; B60W 40/09; B60W 50/14; B60W 50/16; B60W 2050/143; B60W 2050/146; B60W 2750/40; G08G 1/0112; G08G 1/096716; G07C 5/00; G07C 5/002; G07C 5/004; G07C 5/0008; G07C 5/0808; G07C 5/0816; G07C 5/0841; G06Q 10/04; G06Q 10/06; H04L 67/025
USPC ........ 340/439, 457, 5.1, 870.02, 870.07, 905; 455/414.1, 418, 422.1, 423, 456.2, 455/466; 701/1, 123, 2, 29.1, 29.3, 29.4, 701/29.5, 29.6, 31.4, 31.5, 32.7, 33.4, 33.9, 701/34.2, 455, 48, 51, 516, 532; 705/14.23, 705/14.49, 14.54, 14.57, 14.58, 14.64, 705/14.68, 14.71, 305, 4, 7.38, 7.42; 709/219
See application file for complete search history.

(56) References Cited

U.S. PATENT DOCUMENTS 6,091,956 A    7/2000 Hollenberg
6,594,579 B1 * 7/2003 Lowrey et al. ................ 701/123

(Continued)

FOREIGN PATENT DOCUMENTS

JP    2001-108477    4/2001
JP    2002-195843    7/2002

(Continued)

OTHER PUBLICATIONS

Final Office Action issued on Mar. 26, 2013 in U.S. Appl. No. 13/216,786.

(Continued)

*Primary Examiner* — Fadey Jabr
*Assistant Examiner* — Kevin P Mahne
(74) *Attorney, Agent, or Firm* — Greer, Burns & Crain, Ltd.

(57) ABSTRACT

Provided is an Internet telematics service providing system and method that may provide driving information for mileage enhancement. In interaction with a telematics system of a vehicle and a communication terminal of a user, the Internet telematics service providing system may include a data receiver to receive driving data associated with a mileage of the vehicle from the telematics system, a data storage unit to store the driving data in a webpage associated with the user, a data providing unit to provide the stored driving data to the telematics system and/or the communication terminal using a Web service, a guide generator to generate driving guide information of the vehicle based on the driving data, and a guide providing unit to provide the driving guide information to the user using the telematics system and/or the communication terminal.

4 Claims, 6 Drawing Sheets

(51) Int. Cl.

| | |
|---|---|
| *G08G 1/09* | (2006.01) |
| *G08G 1/123* | (2006.01) |
| *G07C 5/08* | (2006.01) |
| *G01F 9/00* | (2006.01) |
| *G07C 5/00* | (2006.01) |
| *G08G 1/0967* | (2006.01) |
| *B60W 40/09* | (2012.01) |
| *B60W 50/14* | (2012.01) |
| *B60W 50/16* | (2012.01) |

(52) U.S. Cl.
 CPC ........ *G07C 5/0808* (2013.01); *G08G 1/096716* (2013.01); *B60W 50/16* (2013.01); *G07C 5/0816* (2013.01); *G07C 5/0841* (2013.01)

(56) References Cited

U.S. PATENT DOCUMENTS

| | | | |
|---|---|---|---|
| 6,611,740 B2 * | 8/2003 | Lowrey et al. | 701/29.4 |
| 7,899,591 B2 * | 3/2011 | Shah et al. | 701/29.4 |
| 8,041,779 B2 | 10/2011 | Habaguchi et al. | |
| 2002/0046084 A1 | 4/2002 | Steele et al. | |
| 2004/0172193 A1 | 9/2004 | Monde et al. | |
| 2006/0155437 A1 * | 7/2006 | Wang et al. | 701/29 |
| 2006/0212194 A1 * | 9/2006 | Breed | 701/29 |
| 2008/0004788 A1 * | 1/2008 | Dorfstatter et al. | 701/117 |
| 2008/0147245 A1 * | 6/2008 | Koepf et al. | 701/1 |
| 2008/0248815 A1 | 10/2008 | Busch | |
| 2009/0134991 A1 * | 5/2009 | Shuart | 340/457 |
| 2009/0326753 A1 * | 12/2009 | Chen et al. | 701/29 |
| 2010/0088163 A1 * | 4/2010 | Davidson et al. | 705/11 |
| 2010/0152960 A1 * | 6/2010 | Huber et al. | 701/33 |
| 2010/0160013 A1 * | 6/2010 | Sanders | 463/6 |
| 2010/0191403 A1 * | 7/2010 | Krause | 701/29 |
| 2010/0214089 A1 * | 8/2010 | Giuli | 340/459 |
| 2011/0207439 A1 * | 8/2011 | Ross et al. | 455/414.1 |
| 2011/0270486 A1 * | 11/2011 | Stevens et al. | 701/33 |
| 2012/0053759 A1 * | 3/2012 | Lowrey et al. | 701/2 |
| 2012/0054030 A1 | 3/2012 | Nam et al. | |
| 2012/0054035 A1 | 3/2012 | Nam et al. | |
| 2012/0054036 A1 | 3/2012 | Nam et al. | |
| 2012/0109579 A1 * | 5/2012 | Kersey et al. | 702/182 |
| 2012/0173075 A1 * | 7/2012 | Mays | 701/34.2 |
| 2012/0221216 A1 * | 8/2012 | Chauncey et al. | 701/51 |
| 2012/0239462 A1 * | 9/2012 | Pursell et al. | 705/7.38 |
| 2012/0253888 A1 * | 10/2012 | Davidson | 705/7.38 |
| 2013/0164714 A1 * | 6/2013 | Hunt et al. | 434/65 |

FOREIGN PATENT DOCUMENTS

| | | |
|---|---|---|
| JP | 2002-281166 | 9/2002 |
| JP | 2002-334168 | 11/2002 |
| JP | 2003-130660 | 5/2003 |
| JP | 2003-271632 | 9/2003 |
| JP | 2004-157909 | 6/2004 |
| JP | 2004-213404 | 7/2004 |
| JP | 2005-181062 | 7/2005 |
| JP | 2006-036132 | 2/2006 |
| JP | 2007-058344 | 3/2007 |
| JP | 2007-072588 | 3/2007 |
| JP | 2007-219595 | 8/2007 |
| JP | 2007-264766 | 10/2007 |
| JP | 2008-204130 | 9/2008 |
| JP | 2008-225889 | 9/2008 |
| JP | 2009-064254 | 3/2009 |
| JP | 2010-054484 | 3/2010 |
| KR | 10-2004-0050546 | 6/2004 |
| KR | 10-2008-0005792 | 1/2008 |
| WO | 2005-057519 | 6/2005 |
| WO | 2007/138744 | 12/2007 |

OTHER PUBLICATIONS

Non-Final Office Action of U.S. Appl. No. 13/215,630 mailed Jan. 24, 2013.
Non-Final Office Action of U.S. Appl. No. 13/217,588 mailed Dec. 20, 2012.
Non-Final Office Action of U.S. Appl. No. 13/216,786 mailed Dec. 20, 2012.
Final Office Action for related U.S. Appl. No. 13/217,588 dated Mar. 21, 2013.
Final Office Action issued on Jul. 25, 2013 in U.S. Appl. No. 13/215,630.
Korean Office Action issued on May 28, 2015 by the Korean Patent Office in corresponding to Korean patent application No. 10-2010-0082310.

* cited by examiner

INTERNET TELEMATICS SERVICE PROVIDING SYSTEM AND INTERNET TELEMATICS SERVICE PROVIDING METHOD FOR PROVIDING MILEAGE-RELATED DRIVING INFORMATION

CROSS REFERENCE TO RELATED APPLICATION

This application claims priority from and the benefit of Korean Patent Application No. 10-2010-0082310, filed on Aug. 25, 2010, which is hereby incorporated by reference for all purposes as if fully set forth herein.

BACKGROUND OF THE INVENTION

1. Field of the Invention

Exemplary embodiments of the present invention relate to an Internet telematics service providing system and method that may provide driving information for better fuel mileage enhancement.

2. Discussion of the Background

Currently, there has been active development in telematics technology of providing various services, for example, an automatic accident report, an emergency service call, a guide service, and the like, to a driver via a terminal installed in a vehicle by integrally employing a mobile communication technology, a satellite positioning technology, a map information technology, a vehicle control technology, and the like. The telematics technology may provide a more convenient and safe driving environment and may also be evolved into an environment in which the driver may use information services in the vehicle without disconnection.

Proposed is a system and method that may provide more available information to a driver of a vehicle using various Internet services.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide an Internet telematics service providing system and method that may provide a function to enable a user to manage driving data associated with a mileage (fuel consumption per mile) of a vehicle and to use the driving data, thereby enhancing the mileage of the vehicle.

Exemplary embodiments of the present invention also provide an Internet telematics service providing system and method that may motivate a user to be more interested in the mileage enhancement through comparison of driving data between the user and another user.

Exemplary embodiments of the present invention also provide an Internet telematics service providing system and method that may provide, to a user riding a vehicle in real time, driving guide information that enables the user to achieve the optimal mileage based on driving data collected from the Web.

Additional features of the invention will be set forth in the description which follows, and in part will be apparent from the description, or may be learned by practice of the invention.

An exemplary embodiment of the present invention discloses a system for providing an Internet telematics service, the system including, in interaction with a telematics system of a vehicle and a communication terminal of a user, a data receiver to receive driving data associated with a mileage of the vehicle from the telematics system, a data storage unit to store the driving data in a webpage associated with the user, a data providing unit to provide the stored driving data to the telematics system and/or the communication terminal using a Web service, a guide generator to generate driving guide information of the vehicle based on the driving data, and a guide providing unit to provide the driving guide information to the user using the telematics system and/or the communication terminal.

An exemplary embodiment of the present invention also discloses a method of providing an Internet telematics service in an Internet telematics service providing system, the method, through interaction between the Internet telematics service providing system and each of a telematics system of a vehicle and a communication terminal of a user, includes receiving driving data associated with a mileage of the vehicle from the telematics system, storing the driving data in a webpage associated with the user, providing the stored driving data to the telematics system and/or the communication terminal using a Web service. The method also includes generating driving guide information of the vehicle based on the driving data and providing the driving guide information to the user using the telematics system and/or the communication terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
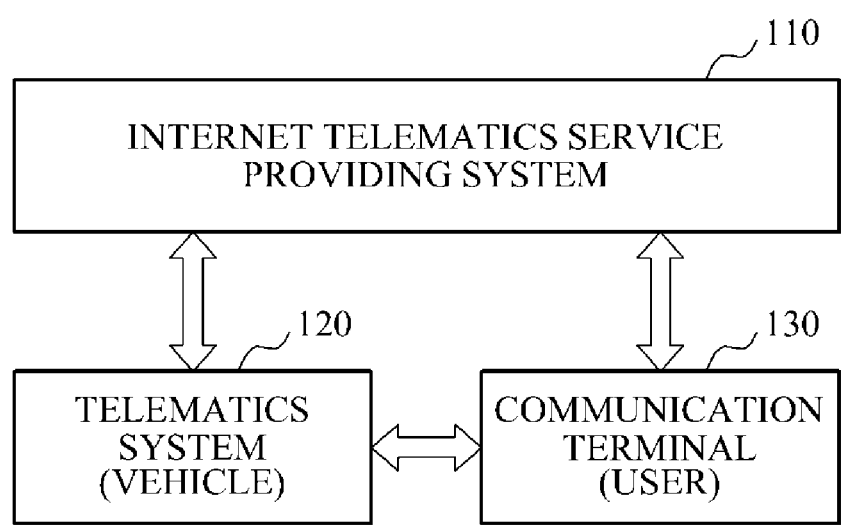
FIG. 1 is a block diagram to describe a relationship among a telematics system, a communication terminal, and an Internet telematics service providing system according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be described in detail with reference to the accompanying drawings.

FIG. 1 is a block diagram to describe relationship among a telematics system 120, a communication terminal 130, and an Internet telematics service providing system 110 according to an exemplary embodiment of the present invention. Referring to FIG. 1, the telematics system 120 of a vehicle and the communication terminal 130 of a user may interact with the Internet telematics service providing system 110.

The Internet telematics service providing system 110 may continuously store driving data of the vehicle, and may provide a user with a Web service capable of providing the user with motivating information about a mileage management, in interaction with the telematics system 120 and/or the communication terminal 130. That is, the Internet telematics service providing system 110 may store the driving data in a webpage associated with the user, and may provide the driving data to the telematics system 120 and/or the communication terminal 130 using the Web service. Also, the Internet telematics service providing system 110 may provide, to the telematics system 120 and/or the communication terminal 130 in real time, driving guide information for the mileage enhancement with respect to current driving data of the vehicle being driven.

The telematics system 120 may indicate, for example, a navigation terminal installed in the vehicle, and may communicate with the Internet telematics service providing system 110 and/or the communication terminal 130 over a wireless data network.

The communication terminal 130 may indicate a mobile terminal, for example, a portable personal computer (PC), a mobile phone, and the like, and may communicate with the Internet telematics service providing system 110 and/or the telematics system 120 over the wireless data network.

Figure 2:
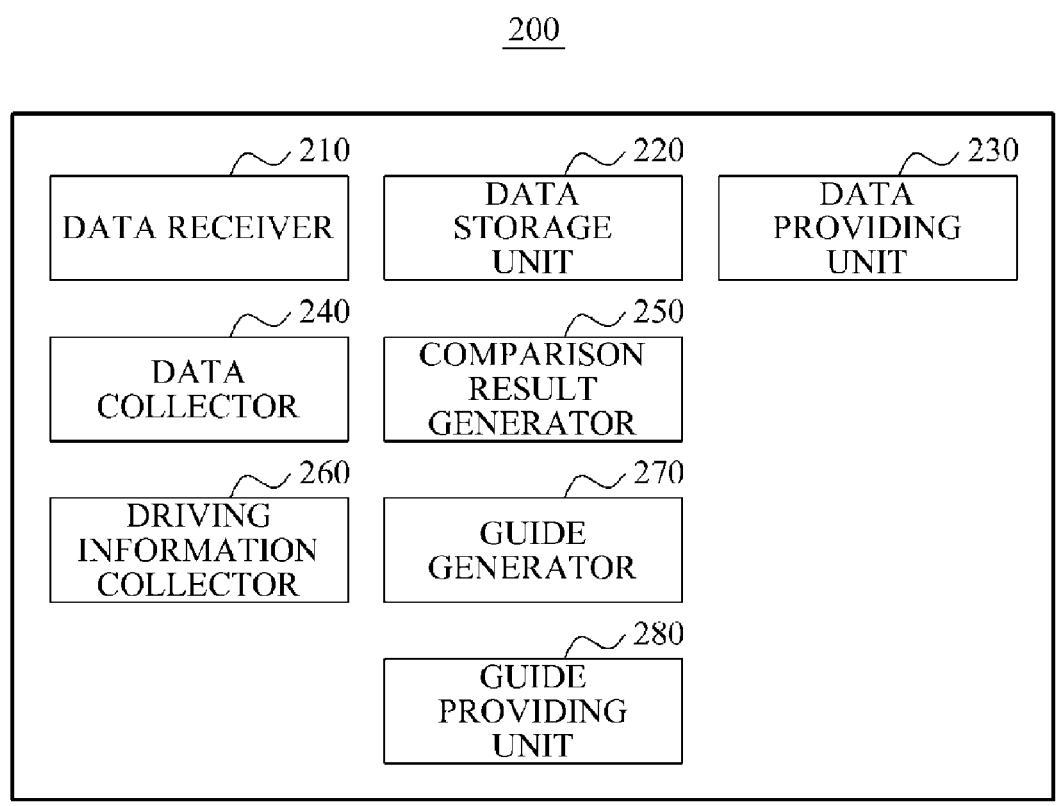
FIG. 2 is a block diagram illustrating a configuration of an Internet telematics service providing system for providing driving information for mileage enhancement according to an exemplary embodiment of the present invention.

FIG. 2 is a block diagram illustrating a configuration of an Internet telematics service providing system 200 for providing driving information for mileage enhancement according to an exemplary embodiment of the present invention. Referring to FIG. 2, the Internet telematics service providing system 200 may include a data receiver 210, a data storage unit 220, a data providing unit 230, a data collector 240, a comparison result generator 250, a driving information collector 260, a guide generator 270, and a guide providing unit 280.

The data receiver 210 may receive driving data associated with a mileage of a vehicle from the telematics system 120. The telematics system 120 may internally directly detect driving data of the vehicle, for example, acceleration data, deceleration data, fuel gauge information, a current location, and the like, or may receive the driving data from the vehicle. For example, the acceleration data or the deceleration data may indicate a speed signal sensed at a vehicle speed sensor, and the fuel gauge information may indicate a fuel level signal sensed at a fuel gauge.

The data storage unit 220 may store driving data of the vehicle in a webpage associated with the user. Here, the webpage associated with the user may indicate a page allocated to the user at a corresponding website. The webpage for storing the driving data is a page allocated in association with the vehicle and thus, may indicate a page subordinate to a Web community site, for example, blog, café, and the like, or may indicate a page within a Web community site that is independently present in association with the vehicle.

Figure 3:
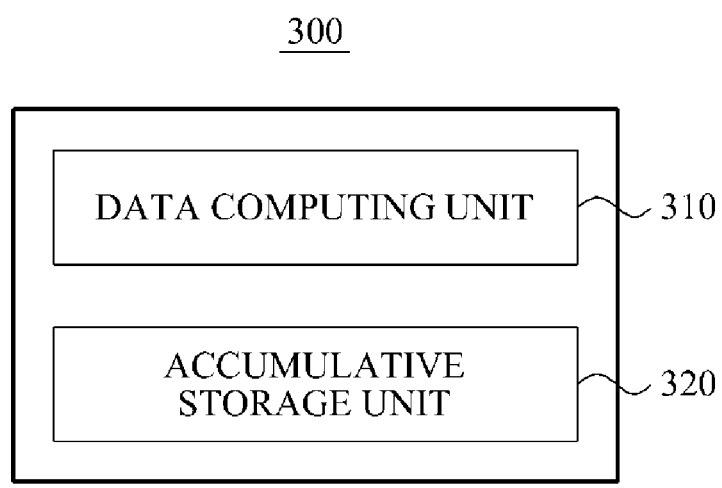
FIG. 3 is a block diagram illustrating a configuration of a data storage unit to store driving data of a vehicle in an Internet telematics service providing system according to an exemplary embodiment of the present invention.

FIG. 3 is a block diagram illustrating a configuration of a data storage unit 300 to store driving data of a vehicle in an Internet telematics service providing system according to an exemplary embodiment of the present invention. The Internet telematics service providing system according to the present embodiment may correspond to the Internet telematics service providing system 200 of FIG. 2. The data storage unit 300 may correspond to the data storage unit 220 of FIG. 2 and may include a data computing unit 310 and an accumulative storage unit 320.

The data computing unit 310 may compute management data about at least one of acceleration/deceleration information of the vehicle, a consumed fuel amount thereof, a driving distance thereof, a mileage thereof, and the like, based on the driving data. For example, the data computing unit 310 may compute the acceleration/deceleration information, the consumed fuel amount, the driving distance, and the mileage, based on acceleration data, deceleration data, fuel gauge information and the like.

The accumulative storage unit 320 may accumulate the management data for each data during a predetermined period and thereby store the management data. For example, the accumulative storage unit 320 may manage management data for each period based on a predetermined period unit, or may store the management data by updating the management data with data of a predetermined latest period.

Referring again to FIG. 2, the data providing unit 230 may provide the stored driving data to the telematics system 120 and/or the communication terminal 130 using the Web service. The data providing unit 230 may provide a webpage including the driving data to the communication terminal 130 using the Web service, so that the user may verify and manage the driving data inside and outside the vehicle.

According to the above configuration of FIG. 2, the Internet telematics service providing system 200 may provide a function that enables a user to manage and utilize driving data associated with a mileage of a vehicle, using a Web service.

Figure 4:
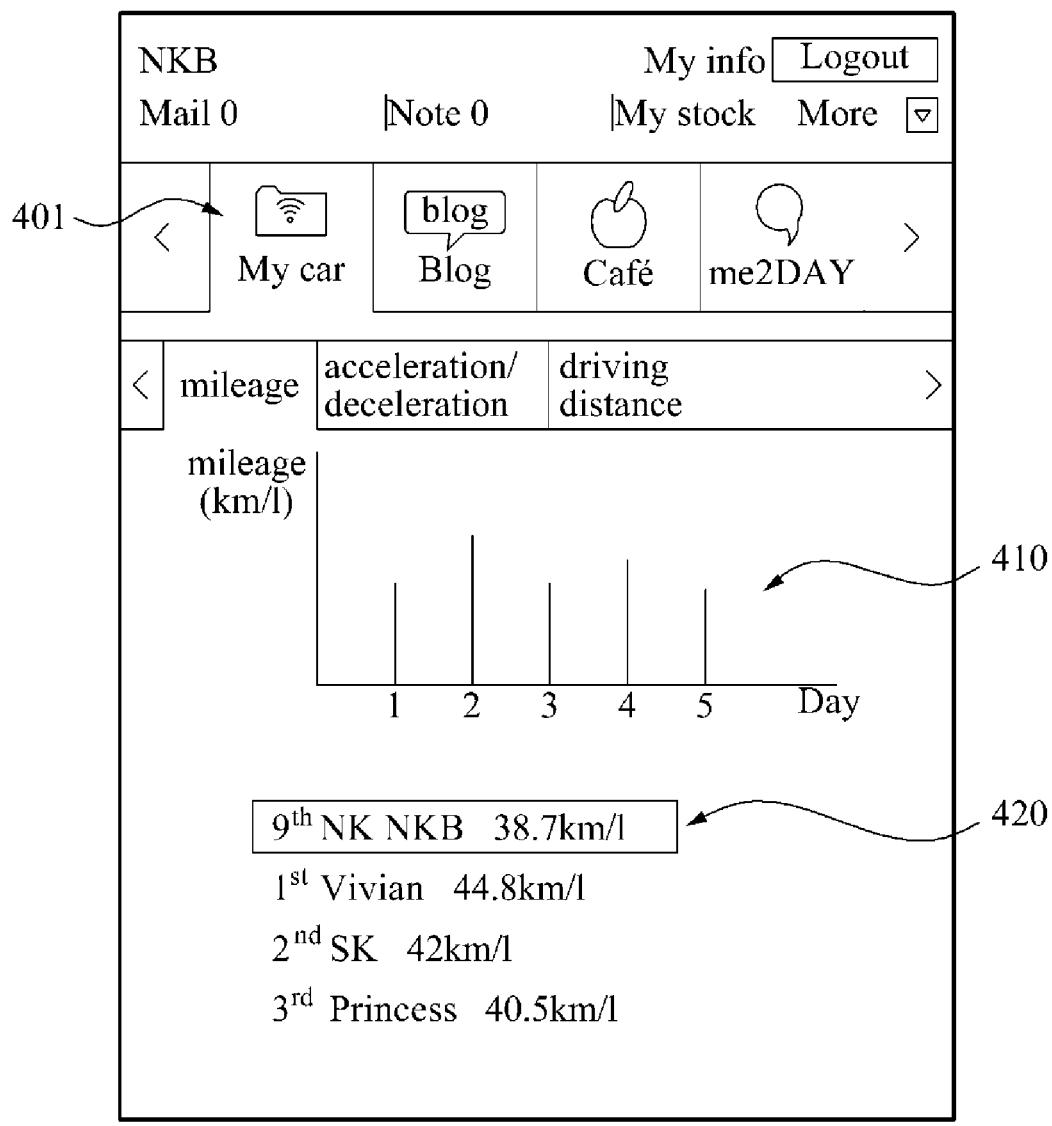
FIG. 4 is a view to describe a webpage displaying driving data of a vehicle according to an exemplary embodiment of the present invention.

FIG. 4 is a view to describe a webpage displaying driving data of a vehicle according to an exemplary embodiment of the present invention. As shown in FIG. 4, the Internet telematics service providing system 200 may provide, to the user, driving data 410 of the vehicle using a Web service providing a webpage 401 associated with the user. The driving data may include management data, for example, a mileage, acceleration/deceleration information, a driving distance, and the like. The Internet telematics service providing system 200 may classify the driving data 410 for each data item and thereby provide a service so that the user may verify a change in driving data of a predetermined period at a glance. The user may make an inquiry about and may continuously manage the driving data 410 of the vehicle on the Web using the telematics system 120 and/or the communication terminal 130.

Referring again to FIG. 2, the data collector 240 may collect foreign data that is driving data of another user provided from the Web service.

The comparison result generator 250 may generate a comparison result about the driving data by comparing the driving data and the foreign data, and may update the comparison result. The comparison result generator 250 may generate the comparison result with foreign data for each driving data and update the comparison result at predetermined intervals. In this example, the data providing unit 230 may provide the comparison result to the telematics system 120 and/or the communication terminal 130 using the Web service.

According to the above configuration, the Internet telematics service providing system 200 may provide, to the user, a comparison result 420 between the driving data of the user and the foreign data, using the Web service providing the webpage 401 associated with the user, as shown in FIG. 4. The Internet telematics service providing system 200 may classify the comparison result 420 for each data and thereby provide the classified comparison result 420, and may display an evaluation, for example, scores, a ranking, and the like about the driving data of the user. The user may be motivated to enhance a mileage by checking a driving propensity or state of the user based on a comparison with other users on the Web using the telematics system 120 and/or the communication terminal 130.

Referring again to FIG. 2, the driving information collector 260 may collect recommended driving information associated with the vehicle, provided from a manufacturing company server (not shown) of the vehicle, in interaction with the manufacturing company server. The driving information collector 260 may collect recommended driving information based on a driving condition of the vehicle. Here, the driving condition of the vehicle may be information included in driving data of the vehicle, and may include a model of the vehicle, a current location thereof, a road property according to the location, weather, and the like. The recommended driving information may include a recommended speed, speed limit, engine speed in revolutions per minute (RPM), driving style, maintenance, and the like.

The guide generator 270 may generate driving guide information about the vehicle using foreign data that is collected by the data collector 240, and/or recommended driving information that is collected by the driving information collector 260, based on the driving data of the vehicle. As one example, the guide generator 270 may generate the driving guide information based on driving data of another user achieving an optimal mileage among the foreign data. As another example, the guide generator 270 may generate the driving guide information based on a past driving history of the user achieving an optimal mileage corresponding to a current driving condition of the vehicle. As another example, the guide generator 270 may generate the driving guide information based on recommended driving information corresponding to a current driving condition of the vehicle. As still another example, the guide generator 270 may generate the driving guide information corresponding to the current driving condition of the vehicle by combining the foreign data and the recommended driving information. As still another example, the guide generator 270 may generate the driving guide information corresponding to the current driving condition of the vehicle by combining the user history data, foreign data and the recommended driving information. Here, the driving guide information may include at least one of a sudden acceleration alarm, a sudden brake alarm, a recommended speed, a speed limit, a driving style, and the like. As one example, the guide generator 270 may determine a speed limit at the current location of the vehicle, based on the user history data, foreign data and/or the recommended driving information. Also, the guide generator 270 may compare a current driving speed of the vehicle with the speed limit and determine whether the vehicle is speeding and then, generate driving guide information for an acceleration alarm depending on the determination result. Also, the guide generator 270 may generate a driving style capable of achieving the optimal mileage with respect to a general road and a predetermined road, for example, a highway, based on the user history data, the foreign data and/or the recommended driving information and then may determine the driving style based on the road property according to the current location of the vehicle. Driving style may include driving speed, acceleration, deceleration, cornering, lane change frequency, engine speed, space and proximity to other vehicles or obstacles, interval between applying brake and applying fuel, etc.

The guide providing unit 280 may provide driving guide information about the vehicle to the telematics system 120 and/or the communication terminal 130. The guide providing unit 280 may provide the driving guide information according to the driving data of the vehicle to the user in real time using the telematics system 120 and/or the communication terminal 130.

According to the above configuration, the Internet telematics service providing system 200 may compute a driving style capable of achieving the optimal mileage in which a model of a vehicle, a current location thereof, a road property according to the current location, weather, and the like, is reflected, based on recommended driving information that is provided from a manufacturing company of the vehicle, user history data, and/or foreign data that is collected on the Web, and guide the user driving the vehicle in real time. For example, the Internet telematics service providing system 200 may detect the current location of the vehicle and the driving data in real time and provide, to the telematics system 120 and/or the communication terminal 130 in real time, various types of information capable of enhancing the mileage, for example, a sudden acceleration alarm, a brake alarm, a recommended speed notice, a speed limit notice, a driving style notice, and the like with respect to the vehicle.

Figure 5:
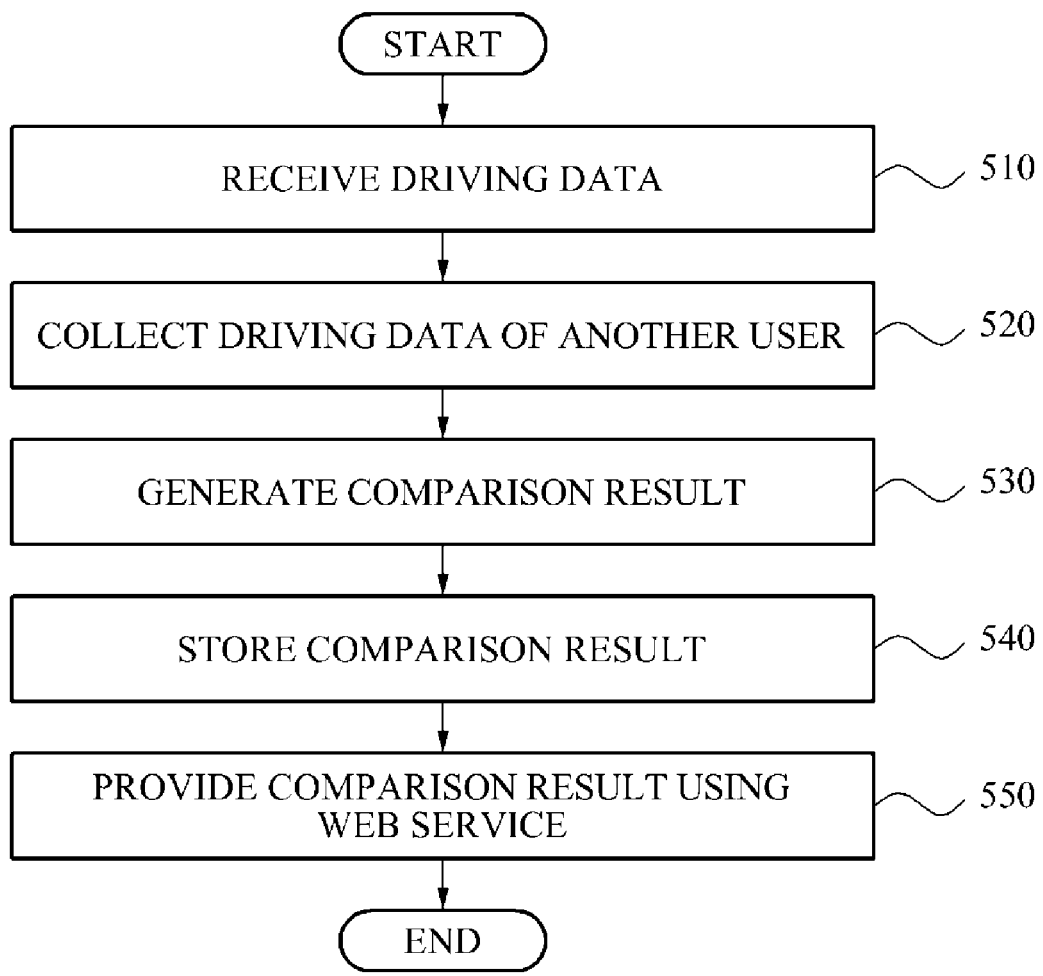
FIG. 5 is a flowchart illustrating an Internet telematics service providing method for providing driving data associated with mileage enhancement using a Web service according to an exemplary embodiment of the present invention.

FIG. 5 is a flowchart illustrating an Internet telematics service providing method for providing driving data associated with mileage enhancement using a Web service according to an exemplary embodiment of the present invention. The Internet telematics service providing method according to the present embodiment may be performed by the Internet telematics service providing system 200 of FIG. 2.

In operation 510, the Internet telematics service providing system 200 may receive driving data associated with a mileage of a vehicle from the telematics system 120. The Internet telematics service providing system 200 may receive, through the telematics system 120, driving data of the vehicle, for example, acceleration data, deceleration data, fuel gage information, a current location, and the like.

In operation 520, the Internet telematics service providing system 200 may collect foreign data that is driving data of another user provided from the Web service.

In operation 530, the Internet telematics service providing system 200 may generate a comparison result about the driving data by comparing the driving data with the foreign data. The Internet telematics service providing system 200 may generate the comparison result for each driving data and update the comparison result at predetermined intervals.

In operation 540, the Internet telematics service providing system 200 may store the driving data of the vehicle, received in operation 510, in a webpage associated with the user. For example, the Internet telematics service providing system 200 may compute management data about at least one of acceleration/deceleration information of the vehicle, a consumed fuel amount thereof, a driving distance thereof, a mileage thereof, and the like, based on the driving data, and then accumulate the management data for each data during a predetermined period and thereby store the management data. Also, in operation 540, the Internet telematics service providing system 200 may store the comparison result with the foreign data in the webpage associated with the user.

In operation 550, the Internet telematics service providing system 200 may provide the comparison result to the telematics system 120 and/or the communication terminal 130 using the Web service. The Internet telematics service providing system 200 may provide the comparison result to the user using the Web service so that the user may verify and manage the driving data inside and outside the vehicle.

Figure 6:
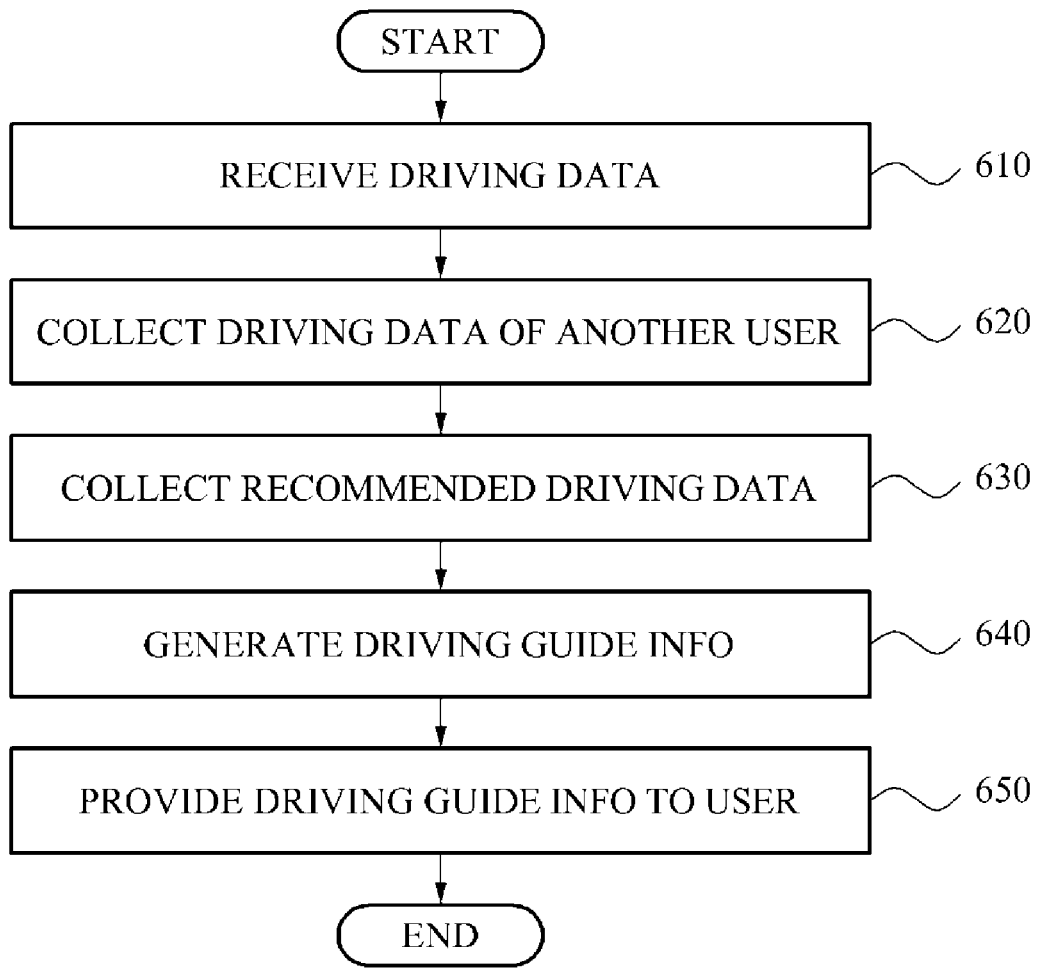
FIG. 6 is a flowchart illustrating an Internet telematics service providing method for providing driving guide information based on driving data of a vehicle in real time according to an exemplary embodiment of the present invention.

FIG. 6 is a flowchart illustrating an Internet telematics service providing method for providing driving guide information based on driving data of a vehicle in real time according to an exemplary embodiment of the present invention. The Internet telematics service providing method according to the present embodiment may be performed by the Internet telematics service providing system 200 of FIG. 2.

In operation 610, the Internet telematics service providing system 200 may receive driving data of a vehicle from the telematics system 120. For example, the driving data may include acceleration data, deceleration data, fuel gauge information, a current location, and the like.

In operation 620, the Internet telematics service providing system 200 may collect foreign data that is driving data of another user provided from a Web service.

In operation 630, the Internet telematics service providing system 200 may collect recommended driving information associated with the vehicle, which is recommended from a manufacturing company, in interaction with a manufacturing company server of the vehicle. The Internet telematics service providing system 200 may collect at least one piece of recommended driving information among a recommended speed, a speed limit, engine RPM, and a driving style with respect to a model of the vehicle, a location thereof, a road property thereof, weather, and the like.

In operation 640, the Internet telematics service providing system 200 may generate driving guide information about the vehicle using the data received in operation 610, the foreign data and/or the collected recommended driving information, based on driving data of the vehicle. As one example, the Internet telematics service providing system 200 may generate the driving guide information based on driving data of another user achieving an optimal mileage among the foreign data. As another example, the Internet telematics service providing system 200 may generate the driving guide information based on a past driving history of the user achieving an optimal mileage corresponding to a current driving condition of the vehicle. As another example, the Internet telematics service providing system 200 may generate the driving guide information based on recommended driving information corresponding to a driving condition of the vehicle being driven, for example, a model of the vehicle, a road property according to a current location, weather, and the like. As still another example, the Internet telematics service providing system 200 may generate the driving guide information corresponding to the current driving condition of the vehicle by combining the foreign data and the recommended driving information. As still another example, the Internet telematics service providing system 200 may generate the driving guide information corresponding to the current driving condition of the vehicle by combining the user history data, foreign data and the recommended driving information. Here, the driving guide information may include at least one of a sudden acceleration alarm, a sudden brake alarm, a recommended speed, a speed limit, a driving style, and the like.

In operation 650, the Internet telematics service providing system 200 may provide driving guide information about the driving data of the vehicle to the user in real time using the telematics system 120 and/or the communication terminal 130.

As described above, according to exemplary embodiments of the present invention, it is possible to provide a function that enables a user to manage and utilize driving data associated with a mileage. The user may make an inquiry about and may continuously manage the driving data of the vehicle on the Web using a telematics system and/or a communication terminal. Also, since a comparison result between driving data of the user and foreign data of another user is provided using a Web service, the user may be motivated to enhance the mileage by comparing the user's driving propensity or state with other drivers. Also, it is possible to compute a driving style capable of achieving the optimal mileage in which a model of a vehicle, a current location thereof, a road property according to the current location, weather, and the like, is reflected, based on recommended driving information that is provided from a manufacturing company of the vehicle, and/or foreign data that is collected on the Web, and to guide the user driving the vehicle in real time.

According to exemplary embodiments of the present invention, a driver is enabled to become more interested in and thereby achieve mileage enhancement by providing a function that enables the driver to manage and utilize driving data associated with the mileage using a Web service.

According to exemplary embodiments of the present invention, it is possible to motivate a user to achieve mileage enhancement by continuously storing driving data and comparing driving data of the user and driving data of another user.

According to exemplary embodiments of the present invention, it is possible to directly enhance a mileage of a vehicle by providing, to a user driving the vehicle in real time, driving guide information capable of achieving an optimal mileage based on driving data collected from the Web.

While the system and method have been described as an Internet telematics service providing system and method that may provide driving information for better fuel mileage enhancement through the Internet, the invention is not limited to an Internet system and method. That is, the system and method could be implemented on another closed or open network communication system other than the Internet in another exemplary embodiment. In such an exemplary embodiment the telematics system, the communication terminal, and the telematics service providing system may communicate using transmitters and receivers or transceivers on the open or closed network communication system or by a wired connection download and upload at time intervals or mileage intervals. The telematics system, the communication terminal, and the telematics service providing system may include processors programmed to implement the communications and process data. The telematics system, the communication terminal, and the telematics service providing system may include non-transitory memory to store data to transmit and to store data received. Further, the telematics service providing system may store the driving data in a non-transitory memory of a database indexed associated with a user, a vehicle, or a user and a vehicle combination, and may provide the driving data to the telematics system and/or the communication terminal using the non-Web based service. Such a non-Web based system may include a data receiver, a data storage unit, a data providing unit, a data collector, a comparison result generator, a driving information collector, a guide generator, a guide providing unit, a data computing unit and an accumulative storage unit much as described above and therefore, will not be repeated here.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of providing an Internet telematics service using a processor, the method comprising:
   receiving, into a data receiver comprising a non-transitory memory, driving data associated with a mileage of a vehicle from a telematics system;
   storing the driving data in a webpage;
   providing, via the processor, the stored driving data to the telematics system, a communication terminal, or both the telematics system and the communication terminal using a Web service;
   providing, via the processor, driving guide information of the vehicle based on the driving data; and
   providing the driving guide information using the telematics system, the communication terminal, or both the telematics system and the communication terminal;
   receiving, into a data collector comprising a non-transitory memory, a plurality of foreign data, wherein each of said foreign data corresponds to driving data of another vehicle from the Web service, and
   providing, via the processor, a comparison result about the driving data by comparing, using the processor, the driving data and the foreign data,
   wherein providing the driving guide information comprises providing the driving guide information based at least on the foreign data, and
   wherein providing the comparison result comprises providing the comparison result with the foreign data and the driving data on the webpage, wherein the comparison result includes a ranking of the user in relation to said plurality of foreign data of said other users, and further wherein the ranking is updated at predetermined intervals while the vehicle is being driven, and
   the method further comprising:
   storing the foreign data in the webpage; and
   collecting recommended driving information associated with the vehicle, the recommended driving information provided from a manufacturing company server of the vehicle,
   wherein the providing the driving guide information comprises providing the driving guide information about the vehicle based on the foreign data and the recommended driving information,
   wherein the driving guide information comprises at least one of a sudden acceleration alarm and a sudden brake alarm, as well as at least one of a recommended speed, a speed limit, and a driving style, and
   wherein the providing comprises providing the driving guide information in real time using the telematics system, the communication terminal, or both the telematics system and the communication terminal, and wherein the driving guide information is computed for achieving optimal mileage based on a combination of a model of the vehicle, a current location of the vehicle, a road property according to the current location, the weather at the current location, user history data, and the foreign data.

2. The method of claim 1, further comprising:
   storing the foreign data in the webpage,
   wherein providing the comparison result comprises providing the comparison result to the telematics system, the communication terminal, or both the telematics system and the communication terminal using the webpage.

3. The method of claim 1, wherein the storing comprises:
   computing management data on at least one of an acceleration information of the vehicle, a deceleration information of the vehicle, a consumed fuel amount of the vehicle, a driving distance of the vehicle, and a mileage of the vehicle, based on the driving data; and
   accumulating the management data during a period of time to store the management data.

4. The method of claim 1, wherein the providing the driving guide information further comprises providing the driving guide information using at least one of a driving condition of the model of the vehicle, the location of the vehicle, a road property according to the location, and weather, based on the foreign data and the recommended driving information.

* * * * *